United States Patent
Arai

(10) Patent No.: US 9,777,990 B2
(45) Date of Patent: Oct. 3, 2017

(54) RETICLE UNIT AND OPTICAL APPARATUS

(75) Inventor: Satoshi Arai, Kawasaki (JP)

(73) Assignee: Nikon Vision Co. Ltd., Tokyo (JP)

( * ) Notice: Subject to any disclaimer, the term of this patent is extended or adjusted under 35 U.S.C. 154(b) by 708 days.

(21) Appl. No.: 13/382,916

(22) PCT Filed: Jun. 23, 2010

(86) PCT No.: PCT/JP2010/060663
§ 371 (c)(1),
(2), (4) Date: Jan. 7, 2012

(87) PCT Pub. No.: WO2011/004709
PCT Pub. Date: Jan. 13, 2011

(65) Prior Publication Data
US 2012/0113507 A1   May 10, 2012

(30) Foreign Application Priority Data

Jul. 9, 2009 (JP) ................................. 2009-162425

(51) Int. Cl.
*F41G 1/34* (2006.01)
*G02B 27/10* (2006.01)
(Continued)

(52) U.S. Cl.
CPC ............. *F41G 1/345* (2013.01); *F41G 1/38* (2013.01); *G02B 5/1814* (2013.01); *G02B 27/102* (2013.01); *G02B 27/34* (2013.01)

(58) Field of Classification Search
CPC ........... F41G 1/30–1/345; G02B 5/18–5/1823; G02B 27/10–27/1006;
(Continued)

(56) References Cited

U.S. PATENT DOCUMENTS 5,835,263 A   11/1998   Dobschal
7,175,923 B2   2/2007   Naito et al.
(Continued)

FOREIGN PATENT DOCUMENTS

DE   25 29 418 A1   1/1976
DE   195 25 520 A1   1/1997
(Continued)

OTHER PUBLICATIONS

English translation of International Preliminary Report on Patentability for International Patent Application No. PCT/JP2010/060663, Feb. 14, 2012.
(Continued)

*Primary Examiner* — Kimberly N Kakalec
*Assistant Examiner* — James McGee
(74) *Attorney, Agent, or Firm* — Shapiro, Gabor and Rosenberger, PLLC

(57) ABSTRACT

A reticle unit equipped with an optical apparatus such as a riflescope includes: red and green light sources radiating red light and green light; a disc-like shaped reticle substrate that has a diffraction grating formed at substantially the center of a surface having substantially circular shape; and red and green mirror members converge light radiated from the red and green light sources, make incidence on the reticle substrate from corresponding side surface portions of the reticle substrate to illuminate the diffraction grating so as to emit first order diffracted light reflected and diffracted by the diffraction grating along a normal direction of the diffraction grating.

10 Claims, 7 Drawing Sheets

(51) Int. Cl.
*G02B 5/18* (2006.01)
*G02B 27/34* (2006.01)
*F41G 1/38* (2006.01)

(58) Field of Classification Search
CPC .......... G02B 27/102–27/1053; G02B 27/1086; G02B 23/00
USPC ....... 359/362, 399, 422–424, 427, 428, 503, 359/505, 558, 566–576, 634, 641; 42/111, 119, 122–123, 130–131
See application file for complete search history.

(56) References Cited

U.S. PATENT DOCUMENTS

| | | | |
|---|---|---|---|
| 7,804,643 B2 | 9/2010 | Menges et al. | |
| 8,405,904 B2* | 3/2013 | Dobschal et al. | 359/399 |
| 2006/0092507 A1* | 5/2006 | Menges et al. | 359/428 |
| 2010/0208341 A1 | 8/2010 | Dobschal et al. | |

FOREIGN PATENT DOCUMENTS

| | | |
|---|---|---|
| EP | 1 653 271 A1 | 5/2006 |
| EP | 2 194 420 A2 | 6/2010 |
| EP | 2 367 040 A1 | 9/2011 |
| JP | 59-48500 U | 3/1984 |
| JP | 07-113960 A | 5/1995 |
| JP | 08-278454 A | 10/1996 |
| JP | 09-120029 A | 5/1997 |
| JP | 2004-347980 A | 12/2004 |
| JP | 2004-536269 A | 12/2004 |
| WO | WO-02/055950 A1 | 7/2002 |

OTHER PUBLICATIONS

Extended European Search Report issued Dec. 11, 2014, in European Patent Application No. 10797020.4.

* cited by examiner

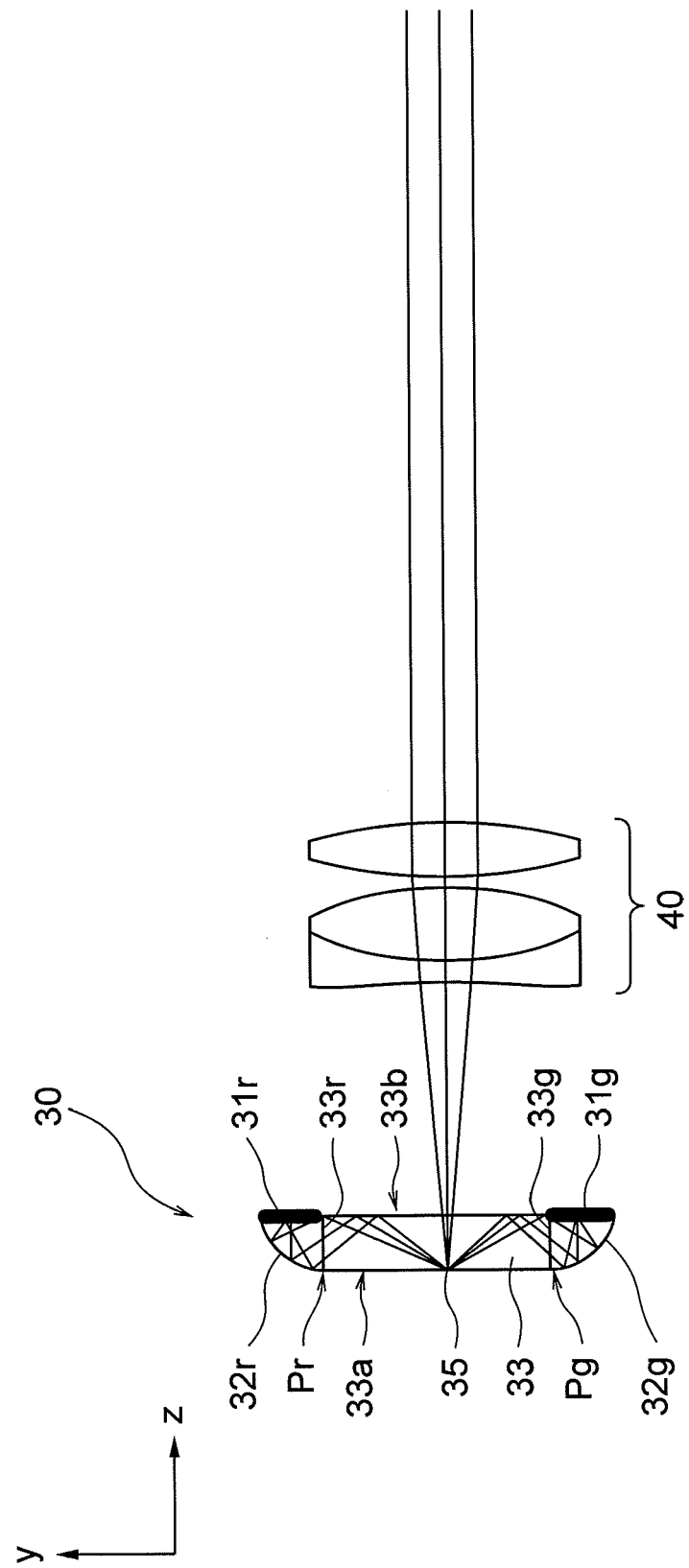

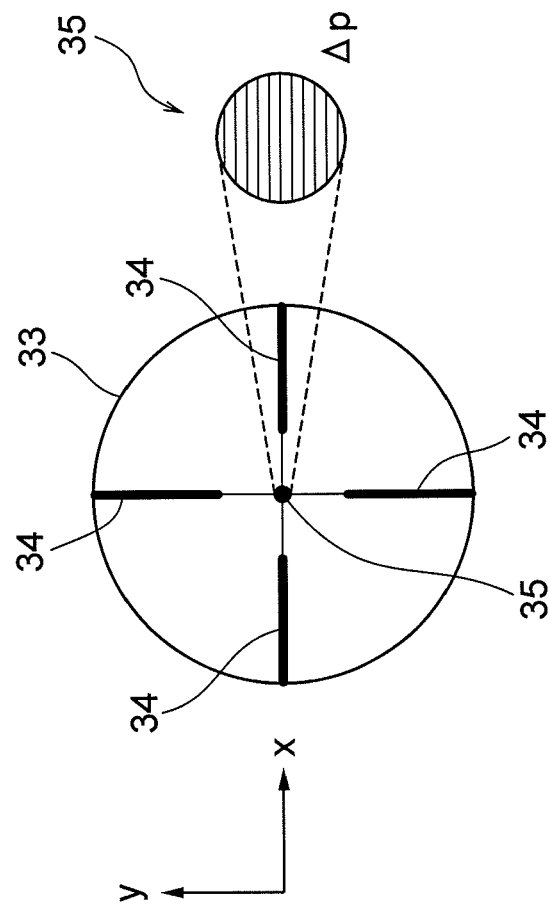
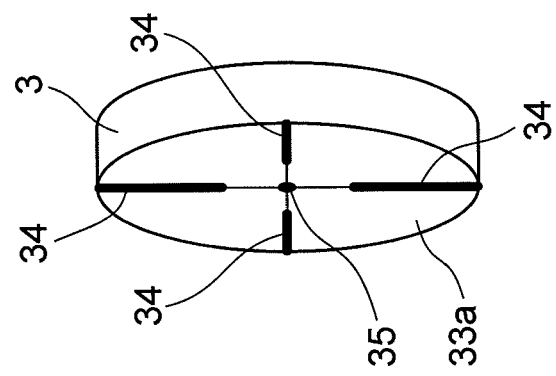

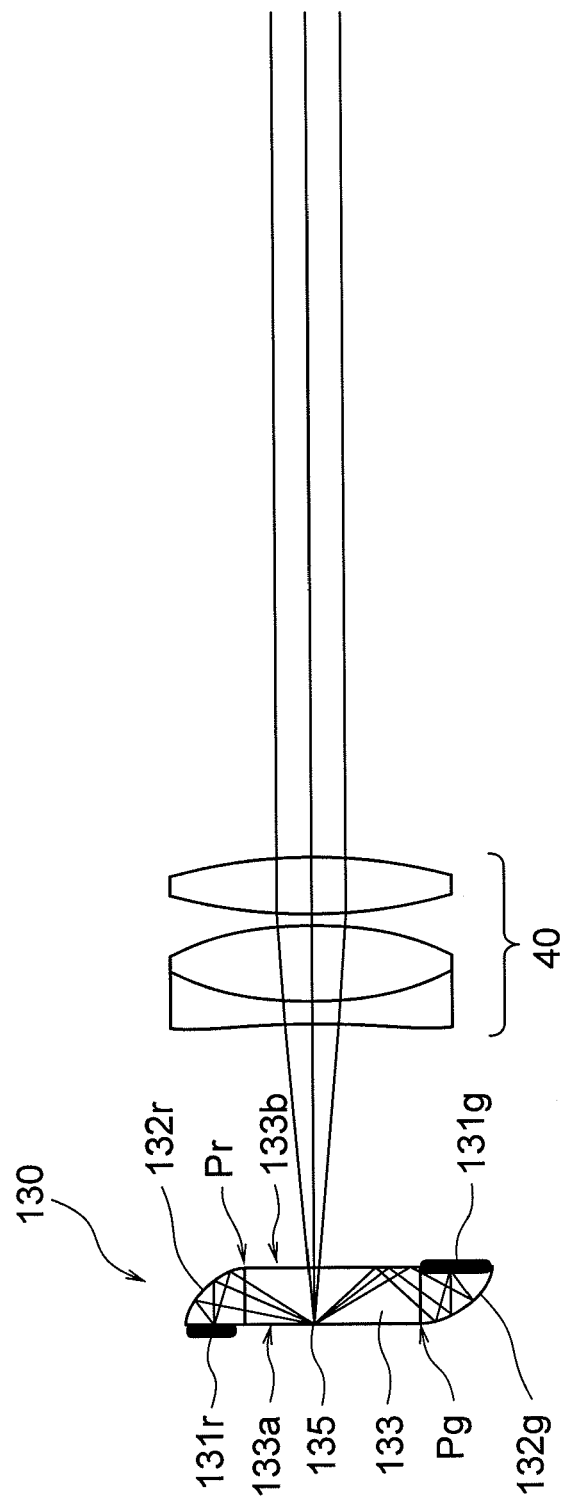

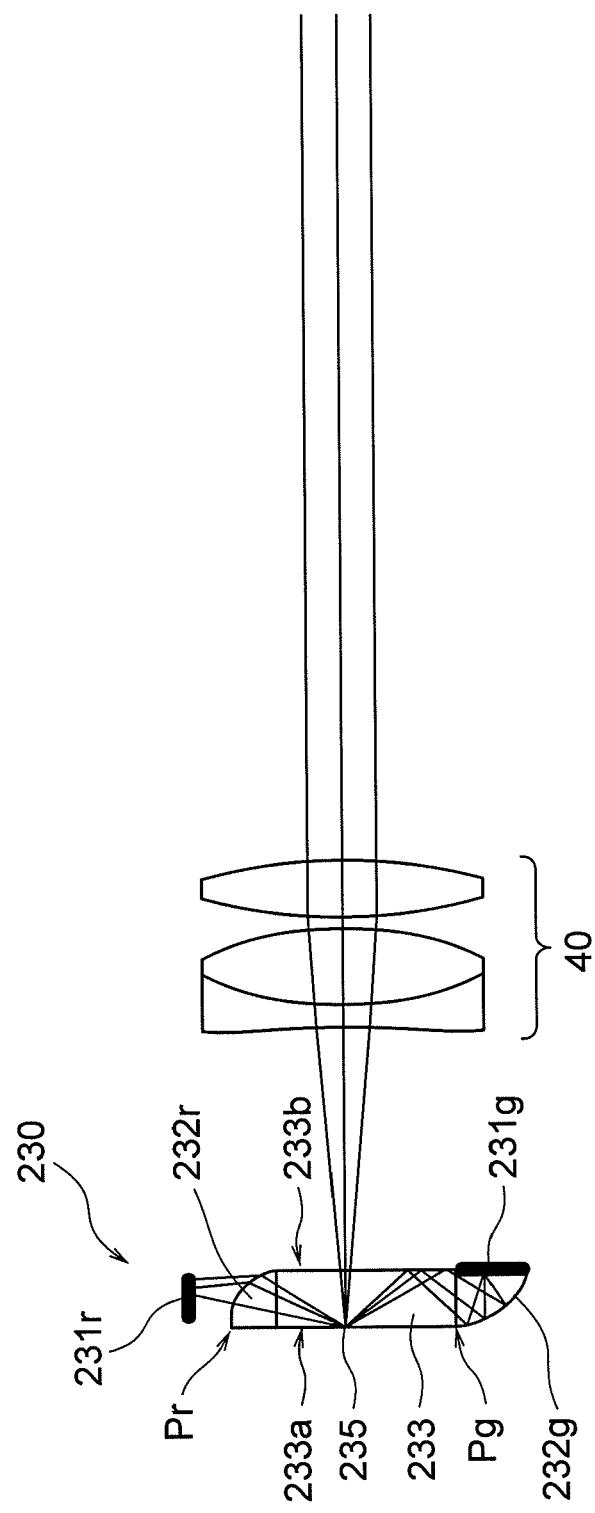

RETICLE UNIT AND OPTICAL APPARATUS

TECHNICAL FIELD

The present invention relates to a reticle unit and an optical apparatus.

BACKGROUND ART

In a sighting device for shooting such as a riflescope, a reticle composed of cross hairs or a dot for aiming a target, or a combined shape thereof are used. In such reticle, for example, there are a one that two wires are perpendicularly crossed, and a one that cross line or a dot is provided on a glass substrate by means of grooves or ink. However, when a conventional sighting device for shooing having a conventional reticle is used in a dark environment such as night, it becomes difficult to secure excellent visibility. Accordingly, there have been provided a one that a reticle on which a phosphorescent agent is applied is illuminated by light, and a one that light is introduced on a reticle by means of an optical fiber (for example, see Japanese Patent Application Laid-Open No. 2004-347980).

However, even if light is introduced on a reticle by means of a phosphorescent agent or an optical fiber, in such a conventional reticle, sufficient light amount cannot be got to the eye, or only a single color of light can be available. Accordingly, in such a conventional reticle, there has been a problem that an excellent visibility cannot be obtained depending on the background.

DISCLOSURE OF THE INVENTION

Problems to be Solved by the Invention

The present invention is made in view of the above-described problem, and has an object to provide a reticle unit capable of securing an excellent visibility regardless of the background, and an optical apparatus equipped with the reticle unit.

Way to Solve the Problems

In order to solve the problem, a reticle unit of the present invention comprises: two or more light sources radiating light having different wavelengths with each other; a reticle substrate that is formed by a material transmitting light with a disc-like shape and has a diffraction grating formed at substantially the center of a surface having substantially circular shape; and converging portions provided with respect to said two or more light sources such that light radiated from the light sources converge on the diffraction grating of the reticle substrate, and first order diffracted light diffracted from the diffraction grating is emitted along a normal direction of the diffraction grating.

In such a reticle unit, it is preferable that the following conditional expression is satisfied:

$$\lambda r/nr < \Delta p < \lambda g/(ng \cdot \sin(\tan^{-1}(Yg/2d)))$$

where $\lambda r$ denotes the longest wavelength among wavelengths of light radiated from the two or more light sources, $\lambda g$ denotes the shortest wavelength among wavelengths of light radiated from the two or more light sources, d denotes a thickness of the reticle substrate, nr denotes a refractive index of a medium of the reticle substrate at the longest wavelength, ng denotes a refractive index of a medium of the reticle substrate at the shortest wavelength, Yg denotes a distance between the diffraction grating and a side surface of the reticle substrate where the light source radiating light having the shortest wavelength is provided, and $\Delta p$ denotes a pitch of the diffraction grating.

Moreover, in such a reticle unit, it is preferable that the light sources are two light sources that radiate light having two different wavelengths, and the two light sources are disposed facing each other with the diffraction grating in between.

Moreover, in such a reticle unit, it is preferable that each of the converging portions is made separately from the reticle substrate, disposed with being cemented to a side surface portion of the reticle substrate, has a reflecting surface having an aspherical shape, and reflects and converges light from the light source by the reflecting surface.

Moreover, in such a reticle unit, it is preferable that the converging portion is separately provided from the reticle substrate, cemented to a side surface portion of the reticle substrate, has a lens surface having an aspherical shape, and refracts and converges light from the light source by the lens surface.

Moreover, in such a reticle unit, it is preferable that the converging portion has substantially the same refractive index of the reticle substrate, and makes total internal reflection of the light incident from the side surface portion of the reticle substrate by a surface opposite to the surface where the diffraction grating is formed on the reticle substrate so as to illuminate the diffraction grating.

An optical apparatus according to the present invention includes an objective lens; any of the above-described reticle unit in which a surface of the reticle substrate where the diffraction grating is formed is disposed at a position of an image formed by the objective lens or a position substantially conjugate with the image; and an eyepiece that observes with superposing the image formed by the objective lens and the light emitted from the diffraction grating of the reticle unit.

Effect of the Invention

With constructing a reticle unit and an optical apparatus equipped with the reticle unit according to the present invention, since light having two colors or more can be emitted from upside of the reticle with switching colors of light, such light can be effectively introduced to an eye, so that excellent visibility of the reticle can be secured regardless of the background.

BRIEF DESCRIPTION OF THE DRAWINGS

FIG. 2 is an explanatory view showing a reticle unit according to Example 1.

FIGS. 3A and 3B are explanatory views showing a reticle substrate composing the reticle unit according to Example 1, in which FIG. 3A is a perspective view, and FIG. 3B is a front view.

FIGS. 5A and 5B are explanatory views explaining a shaving amount upon cementing a red light mirror member and a green light mirror member to the reticle substrate, in which FIG. 5A shows a case the shaving amount is varied with respect to the wavelength, and FIG. 5B shows a case that the same amount is shaved.

FIG. 6 is an explanatory view showing a reticle unit according to Example 2.

FIG. 7 is an explanatory view showing a reticle unit according to Example 3.

EMBODIMENT FOR CARRYING OUT THE INVENTION

Figure 1:
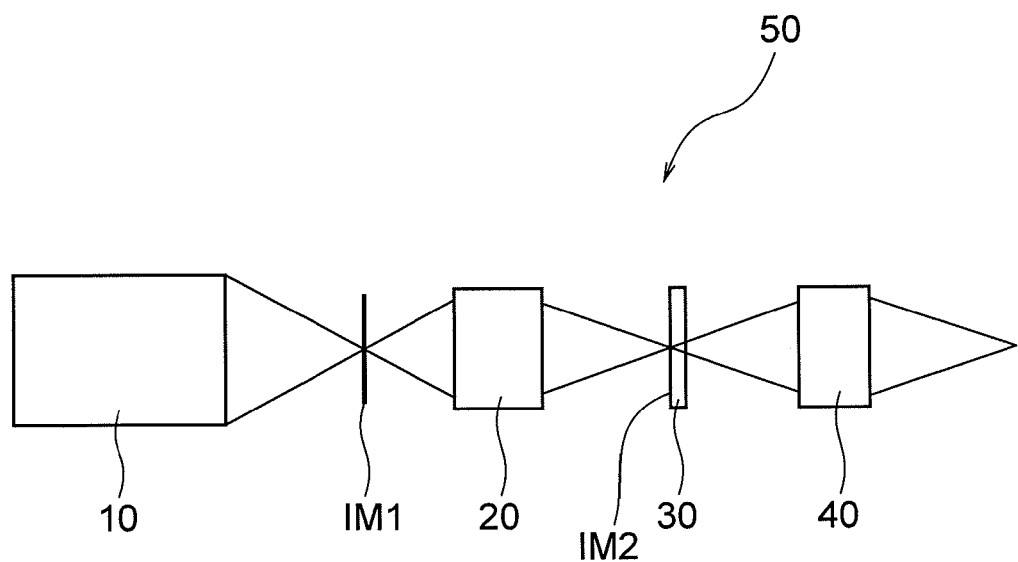
FIG. 1 is an explanatory view showing a construction of a riflescope which is an example of an optical apparatus.

A preferred embodiment of the present invention will be explained below with reference to accompanying drawings. At first, with using FIG. 1, a construction of a riflescope, which is an example of an optical apparatus equipped with a reticle unit according to the present embodiment, is explained. The riflescope 50 is composed of, in order from an object side, an objective lens 10, an erecting lens 20, a reticle unit 30 and an eyepiece 40. The objective lens 10 converges light rays emanated from the object and forms a primary image IM1, which is a reversed image of the object. The erecting lens 20 converts the primary image IM1, which is the reversed image formed by the objective lens 10, into a secondary image IM2, which is an erected image. A reticle formed in the reticle unit 30 is disposed to a position conjugate with the primary image IM1 of the objective lens 10, which substantially coincides with the secondary image IM2. With observing the secondary image IM2 superposing on the reticle by the eyepiece 40, it becomes possible to collimate a target object with accurately coinciding an optical axis of the riflescope 50 with respect to the target object.

Incidentally, the riflescope 50 is an example of an optical apparatus equipped with the reticle unit according to the present embodiment. Moreover, the reticle unit may be applicable to a monocular, a pair of binoculars, a surveying instrument, a spotting scope, and the like. The reticle may be disposed with substantially coinciding with the primary image IM1. Such a reticle unit 30 is explained below in detail.

A construction of the reticle unit 30 according to the present embodiment is explained with reference to FIGS. 2, 3A and 3B. The reticle unit 30 is composed of a red light source 31r radiating red light, a green light source 31g radiating green light, a reticle substrate 33 that is formed into a disc-like shape having a circular shape surface whose substantially center portion is formed into a diffraction grating 35, and a red light mirror member 32r and a green light mirror member 32g that are converging portions for converging red light radiated from the red light source 31r and green light radiated from the green light source 31g onto the diffraction grating 35, respectively.

As shown in FIGS. 2, 3A and 3B, the following explanations are made by a condition that a direction of an optical axis of the riflescope 50 is a z-axis, two vertically crossed directions in a plane perpendicular to the z-axis are x-axis and y-axis, respectively.

The reticle substrate 33 is made from a transparent material such as glass or resin that transmits at least visible light, and the substantially circular shape surface thereof is disposed perpendicularly to the optical axis, in other words, in the x-y plane. On the object side surface of the reticle substrate 33 (hereinafter called an object side surface 33a), a reticle composed of four reticle FIG. 34 extended in x-axis direction and y-axis direction from the central portion to the periphery and the diffraction grating 35 disposed corresponding with the optical axis of the riflescope 50, which is a crossing point of the reticle FIG. 34, is formed. As described above, the object side surface 33a on which the reticle is formed is disposed such that the object side surface 33a substantially coincides with the position of the secondary image IM2 formed by the erecting lens 20. Moreover, the object side surface 33a substantially coincides with an object side focal point of the eyepiece 40.

The pattern of the reticle FIG. 34 formed on the reticle substrate 33 is formed on the object side surface 33a by means of, for example, a chrome film or ink. The diffraction grating 35 is constructed by a reflection type diffraction grating that is formed by a plurality of grooves (diffraction grooves) extended parallel with a given pitch and the object side surface 33a thereof is applied with a reflection coating so that light rays incident on the diffraction grating 35 from the image side via inside of the reticle substrate 33 are reflected and diffracted toward the image side. The diffraction grating 35 has substantially circular shape, and the diameter thereof is, for example, 0.1 µm. In FIGS. 2, 3A and 3B, diffraction grooves of the diffraction grating 35 are composed of a plurality of diffraction grooves formed side by side in the y-axis direction each of which is extended in the x-axis direction.

As shown in FIG. 2, each of the red light mirror member 32r and the green light mirror member 32g has a sectional view of substantially a sector shape in a side view, and a reflection coating is applied on an outer surface of an arc portion. The arc portion has an aspherical shape. Accordingly, the arc portion is formed as a concave mirror having an aspherical shape, so that the mirror reflects and converges light rays incident from one radius side of the sector shape and exits from the other radius side. In each of the red light mirror member 32r and the green light mirror member 32g, one radius of the sector shape of each of the red light mirror member 32r and the green light mirror member 32g is cemented to each end portion of the reticle substrate 33 in a direction where diffraction grooves of the diffraction grating 35 are formed side by side, in other words, each side surface portion 33r and 33g in y-axis direction respectively such that the concave surface thereof faces the image side. Moreover, the red light source 31r and the green light source 31g are attached to the other radius of the sector shapes of the red light mirror member 32r and the green light mirror member 32g, respectively. Accordingly, the red light source 31r and the red light mirror member 32r, and the green light source 31g and the green light mirror member 32g are disposed opposingly to both ends of the reticle substrate 33 in y-axis direction with disposing the diffraction grating 35 in between.

In such a reticle unit 30, light rays radiated from the red light source 31r and the green light source 31g are reflected and converged by concave portions of the red light mirror member 32r and the green light mirror member 32g, respectively, incident on the reticle substrate 33 from side surface portions 33r and 33g of the reticle substrate 33, made total internal reflection on the image side surface of the reticle substrate 33 (hereinafter called an image side surface 33b), and incident on the diffraction grating 35 formed on the object side surface 33a. First order diffracted light diffracted from the diffraction grating 35 is emitted along the optical axis, in other words, the z-axis.

In consideration of the positions of the red light source 31r and the green light source 31g, the concave portions of the red light mirror member 32r and the green light mirror member 32g are disposed such that light rays radiated from the red light source 31r and the green light source 31g are reflected to make angles for generating total internal reflection with respect to the image side surface 33b of the reticle substrate 33. The shapes of aspherical surfaces of the concave portions of the red light mirror member 32r and the green light mirror member 32g, the thickness of the reticle substrate 33, distances in y-axis direction between the diffraction grating 35 and the concave portions, and the pitch of the grooves of the diffraction grating 35 are set such that light rays reflected by the concave portions of the red light mirror member 32r and the green light mirror member 32g, and made total internal reflection by the image side surface 33b of the reticle substrate 33 are converged on the diffraction grating 35, and first order diffracted light rays diffracted by the diffraction grating 35 are emitted along the optical axis, which is z-axis.

Since wavelengths with respect to the red light and the green light differ according to the medium of the reticle substrate 33, and diffracted angle differs with respect to the incident angle on the diffraction grating 35, setting of the red light source 31r differs from that of the green light source 31g. In other words, the shapes of aspherical surfaces of the concave portions of the red light mirror member 32r and the green light mirror member 32g are set with respect to respective light rays.

With constructing the reticle unit 30 according to the present embodiment in this manner, since light rays radiated from the red light source 31r or the green light source 31g are diffracted by the diffraction grating 35, and the first order diffracted light ray forming a point source is emitted from the diffraction grating 35 along the optical axis, an observer can observe a bright spot at the center of the field of view of the eyepiece 40, so that the target object can be easily collimated. Since the light is the first order diffracted light, sufficient light amount for observation is emitted from the diffraction grating 35. With switching the red light source 31r and the green light source 31g, the red light point source and the green light point source can be switched in accordance with the background and surrounding condition of the target object. With constructing a reticle unit 30 such that light rays from the red light source 31r and the green light source 31g are made total internal reflection by the image side surface 33b of the reticle substrate 33, and incident on the diffraction grating 35, even if the thickness of the reticle substrate 33 is thin, the dimension in y-axis direction from the diffraction grating 35 to the side surface portions 33r and 33g of the reticle substrate 33, in other words, the field of view of a riflescope 50 can be secured. Moreover, since the red light source 31r, the green light source 31g, the red light mirror member 32r and the green light mirror member 32g can be disposed to the end portions of the reticle substrate 33, the reticle unit 30 can be compact.

When the reticle unit 30 is installed in the above-described riflescope 50, the red light source 31r, the green light source 31g, the red light mirror member 32r, and the green light mirror member 32g are preferably disposed at the upper end portion and the lower end portion of the reticle substrate 33, (in other words, x-axis becomes horizontal and y-axis becomes vertical in FIGS. 2 and 3) according to the configuration of the device.

Then, in this reticle unit 30, a condition that first order diffracted light rays radiated from the red light source 31r and the green light source 31g having different two wavelengths with each other are emitted along the optical axis, which is in the normal direction of the diffraction grating 35, is explained.

At first, an angle of incidence of light ray incident on the diffraction grating 35 (an angle of incident light ray with respect to the normal of the diffraction grating 35) is denoted by $\theta 1$, an angle of diffraction of m-th order diffracted light ray (an angle of diffraction light ray with respect to the normal of the diffraction grating 35) is denoted by $\theta 2$, the pitch of the diffraction grating 35 (period of diffraction grating) is denoted by $\Delta p$, a refractive index at a given wavelength of a medium of the reticle substrate is denoted by n, and the wavelength of the incident light is denoted by $\lambda$, so that the following expression (1) is applied:

$$\sin \theta 1 + \sin \theta 2 = m\lambda/(n \cdot \Delta p) \qquad (1)$$

where m denotes an order of diffraction, and is an integer.

As described above, in the reticle unit 30, since the first order diffracted light (m=1) is emitted along the optical axis ($\theta 2=0$) that is the normal direction of the diffraction grating 35, expression (1) is shown by the following expression (2):

$$\Delta p \cdot \sin \theta 1 = \lambda/n \qquad (2).$$

As is apparent from expression (2), light having longer wavelength (red light in the present embodiment) among two colors of light has a larger angle of incidence $\theta 1$. Here, in order that the light rays are incident on the diffraction grating 35 from inside of the reticle substrate 33, diffracted and emitted along the optical axis toward the image side, the angle of incidence of the red light has to be $\pi/2$ or less. In other words, in expression (2), the wavelength of the red light is denoted by $\lambda r$, the refractive index of the medium of the reticle substrate 33 is denoted by nr, and the angle of incidence of the red light is denoted by $\theta r$, the following conditional expression (3) has to be satisfied:

$$\theta r = \sin^{-1}(\lambda r/(nr \cdot \Delta p)) < \pi/2 \qquad (3).$$

With changing conditional expression (3), the pitch $\Delta p$ of the diffraction grating 35 has to satisfy the following conditional expression (4):

$$\lambda r/nr < \Delta p \qquad (4).$$

Figure 4:
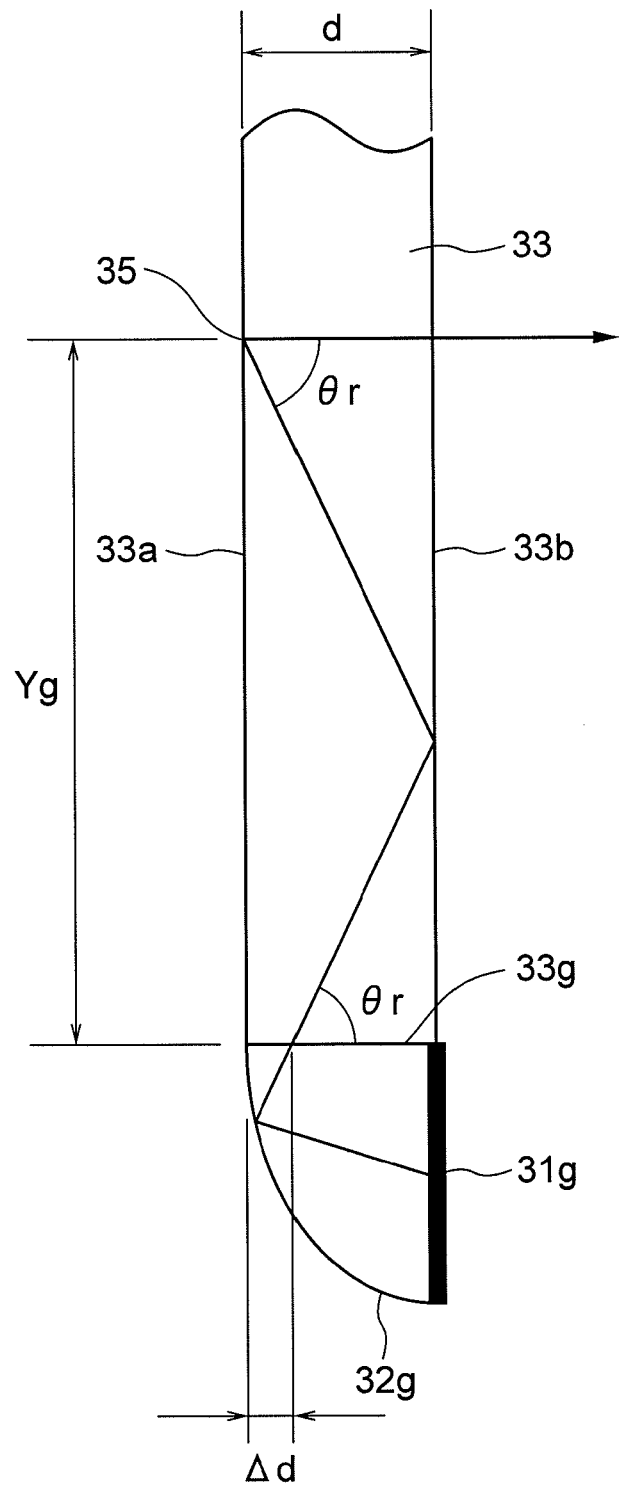
FIG. 4 is an explanatory view showing a relation between a light ray radiated from a light source and a diffraction grating.

On the other hand, the light having shorter wavelength (the green light in the present embodiment) among two colors of light has smaller angle of incidence $\theta 1$ in expression (2). In the reticle unit 30 according to the present embodiment, the light is incident on the diffraction grating 35 after made total internal reflection by the image side surface 33b of the reticle substrate 33. Accordingly, as shown in FIG. 4, although the light ray radiated from the green light source 31g and reflected by the green light mirror member 32g has to incident on the side surface portion 33g of the reticle substrate 33, when the angle of incidence $\theta g$ of the green light ray to the diffraction grating 35 becomes too small, the light ray cannot be incident on the reticle substrate 33 from the side surface portion 33g. In other words, in FIG. 4, when a distance between the object side surface 33a end of the side surface portion 33g of the reticle substrate 33 having the thickness of d and a cross point where the central light ray radiated from the green light source 31g crosses the side surface portion 33g is denoted by $\Delta d$, the value $\Delta d$ has to be larger than zero. This means that when the length in y-axis direction between the center of the diffraction grating 35 and the side surface portion 33g is denoted by Yg, the following expression (5) is satisfied:

$$\Delta d = d - (Yg - d \cdot \tan \theta g)/\tan \theta g > 0 \qquad (5).$$

When the expression (5) is expanded as conditional expression of $\theta g$, conditional expression (6) is derived. From conditional expression (6) and expression (2) where the wavelength of the green light is denoted by $\lambda g$, and the refractive index of the medium of the reticle substrate 33 at the wavelength $\lambda g$ is denoted by ng, the pitch $\Delta p$ of the diffraction grating 35 has to satisfy the following conditional expression (7):

$$\theta g > \tan^{-1}(Yg/2d) \qquad (6)$$

$$\Delta p < \lambda g/(ng \cdot \sin(\tan^{-1}(Yg/2d))) \qquad (7).$$

From the above-described expressions (4) and (7), in order to emit first order diffracted light along the optical axis with respect to any of the two colors of light of the red light and green light, the pitch Δp of the diffraction grating 35 has to satisfy the following conditional expression (8):

$$\lambda r/nr < \Delta p < \lambda g/(ng \cdot \sin(\tan^{-1}(Yg/2d))) \quad (8).$$

Figure 5A:
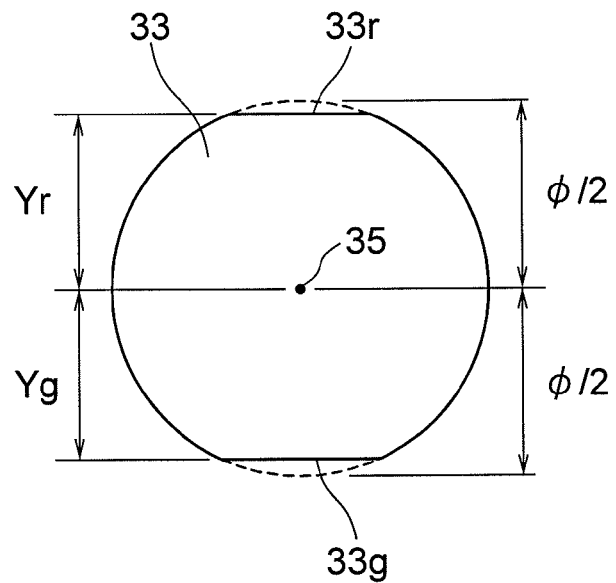
Figure 5B:
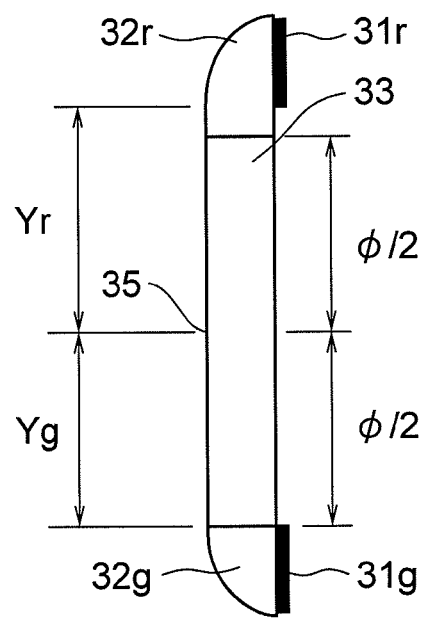

As shown in FIG. 5A, in order to cement the red light mirror member 32r and the green light mirror member 32g with the side surface portions 33r and 33g of the reticle substrate 33 having a disc-like shape, it is preferable that end portions of the reticle substrate 33 are shaved off to become plane surfaces, and the red light mirror member 32r and the green light mirror member 32g are cemented with the plane surfaces. In this instance, although distances Yr and Yg from the diffraction grating 35 formed at the central portion of the reticle substrate 33 to the side surface portions are different with each other in accordance with the wavelengths of the red light and the green light, the difference in the distances Yr and Yg can be dealt with by changing the amounts of shaving of the end portions of the reticle substrate 33 as shown in FIG. 5A. Alternatively, as shown in FIG. 5B, both ends of the reticle substrate 33 are shaved with the same amount in accordance with the shorter distance (the distance Yg corresponding to the green light in the present embodiment), and a length in y-axis direction of the red light mirror member 32r is made longer, so that respective distances Yr and Yg can be satisfied.

Moreover, when the red light mirror member, the green light mirror member and the reticle substrate 34 can be formed by integral molding, the reticle substrate, the red light mirror member, and the green light mirror member may be formed by the same material.

In the above-described explanations, although a case that the red light mirror member 32r and the green light mirror member 32g each having a reflecting surface with an aspherical surface are provided as converging portions converging red light rays and green light rays radiated from the red light source 31r and the green light source 31g onto the diffraction grating 35 is explained, lens member with an aspherical surface for converging red light or green light may be used.

In the above-described explanations, although a case that two colors of light of the red light and green light are used is explained, light having other wavelength can be used, and three or more colors of light may be used. When three or more colors of light are used, the above-described conditional expression (8) becomes a condition where the longest wavelength is denoted by λr, and the shortest wavelength is denoted by λg among three or more colors of light.

EXAMPLES

Then, the reticle unit 30 having an above-described construction is explained with showing specific examples.

Example 1

A reticle unit 30 according to Example 1 is the one used for explaining the above-described embodiment shown in FIGS. 2, 3A and 3B. In the reticle unit 30 according to Example 1, a red light source 31r and a green light source 31g radiate red light and green light substantially parallel to an optical axis toward an object side.

The center (hereinafter called an aspherical surface center) of a reference sphere of the aspherical surface, which is the shape of a reflecting surface composing a red light mirror member 32r (or a green light mirror member 32g) is, as shown by a pint Pr (or Pg) in FIG. 2, a cemented portion where the red light mirror member 32r (or the green light mirror member 32g) and the reticle substrate 33 are cemented. The red light mirror member 32r, the green light mirror member 32g, and the reticle substrate 33 have substantially the same refractive power.

Various values associated with the reticle unit 30 according to Example 1 are listed in Table 1. In Table 1, "d" denotes a thickness of the reticle substrate 33, "φ" denotes a diameter of the reticle substrate 33 having a disc-like shape, "nd" denotes a refractive index at d-line of a medium of the reticle substrate 33, "nC" denotes a refractive index at C-line of the medium of the reticle substrate 33, "vd" denotes an Abbe number, and "Δp" denotes a pitch of a diffraction grating 35. Incidentally, in this example, the wavelength of the red light is d-line, and the wavelength of the green light is C-line. It is needless to say that the present invention is not limited to these wavelengths. Moreover, the shaving amount "D" denotes a distance in y-axis direction from an end portion of the reticle substrate 33 having a disc-like shape to a portion where the reticle substrate is shaved for cementing the red light mirror member 32r (or the green light mirror member 32g). In other words, the length Yr (or Yg) between the diffraction grating 35 of the reticle unit 33 and the end surface where the red light mirror member 32r (or the green light mirror member 32g) is cemented becomes a value that the shaving amount D is subtracted from the radius φ/2 of the reticle substrate 33.

Furthermore, coordinates of the center of light sources of the red light source 31r and the green light source 31g and coordinates of the center of the aspherical surfaces of the red light mirror member and the green light mirror member 32 are shown by values (z, y) in z-axis direction and y-axis direction when the center of the diffraction grating 35 coincides with the intersection point of x-axis, y-axis and z-axis defined in FIGS. 2 and 3. Here, in y-axis direction, a direction toward the red light source 31r is positive, and in z-direction, a direction toward the image side is positive. The shape of the aspherical surface of the reflecting surface of the red light mirror member 32r (or the green light mirror member 32g) is shown by the following expression (9):

$$S(y)=(y^2/r)/(1+(1-(1+\kappa)\cdot(y^2/r^2))^{1/2})+A4\times y^4+A6\times y^6+A8\times y^8+A10\times y^{10} \quad (9)$$

where "y" denotes a vertical height (the height of incidence) from the optical axis, S(y) denotes a distance (aspherical amount or sag amount) along the optical axis from the tangent surface at the vertex of the aspherical surface to the aspherical surface at the vertical height "y" from the optical axis, "r" denotes a radius of curvature of a reference sphere, "κ" denotes a conical coefficient, "A4" denotes a fourth order aspherical coefficient, "A6" denotes a sixth order aspherical coefficient, "A8" denotes a eighth order aspherical coefficient, and "A10" denotes a tenth order aspherical coefficient. A radius of curvature "r", a conical coefficient "κ", and aspherical coefficients "An" in expression (9) are shown. Here, "E-n" shown in aspherical coefficients denotes "×10$^{-n}$".

In various values shown in Table 1, "mm" is generally used for the unit of length such as the thickness "d" of the reticle substrate 33, the diameter "φ", and the pitch "Δp". However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

(reticle substrate 33)

d = 5
φ = 24.2
nd = 1.5168
nC = 1.51432
νd = 64.1
Δp = 0.00051

(red light source 31r)

center of light source = (5, 14.7)
(red light mirror member 32r)

center of aspherical surface = (0, 12.0)
shaving amount D = 0.1
r = 2.74
κ = 6.49
A4 = 0.00208
A6 = −1.86927E−6
A8 = −1.96168E−8
A10 = 0

(green light source 31g)

center of light source = (5, −11)
(green light mirror member 32g)

center of aspherical surface = (0, −8.8)
shaving amount D = 3.3
r = 3.78
κ = 2.39
A4 = −0.00227
A6 = 0.00026
A8 = −5.29054E−6
A10 = 0

TABLE 2

(reticle substrate 133)

d = 5
φ = 24.8
nd = 1.5168
nC = 1.51432
νd = 64.1
Δp = 0.00047

(red light source 131r)

center of light source = (0, 10.7)
(red light mirror member 132r)

center of aspherical surface = (5, 8.0)
shaving amount D = 4.4
r = −4.74
κ = 0.56
A4 = 0.00127
A6 = −1.16884E−5
A8 = −1.56090E−7
A10 = 0

(green light source 131g)

center of light source = (5, −15.9)
(green light mirror member 132g)

center of aspherical surface = (0, −12.3)
shaving amount D = 0.1
r = 5.83
κ = 0.16
A4 = −0.00144
A6 = −1.34186E−5
A8 = −5.29054E−6
A10 = −2.14739E−8

With constructing the reticle unit 30 according to Example 1 on the basis of the above-described values, since red light rays and green light rays radiated from the red light source 31r or the green light source 31g are diffracted by the diffraction grating 35 and the first order diffracted light rays thereof are emitted along the optical axis, with switching these light sources 31r and 31g, a bright red or green point image can be observed on the optical axis of the field of view through the eyepiece 40.

Example 2

Then, a reticle unit 130 according to Example 2 is explained with reference to FIG. 6. In the reticle unit 130 according to Example 2, a red light source 131r and a green light source 131g radiate red light rays and green light rays substantially parallel to an optical axis. Red light rays radiated from the red light source 131r, after reflected from the red light mirror member 132r, does not make total internal reflection on the image side surface 133b of the reticle substrate 133, but are incident directly on the diffraction grating 135. Accordingly, red light rays radiated from the red light source 131r are radiated to the image side. Green light rays radiated from the green light source 131g are radiated to the object side similar to Example 1. The center of the aspherical surface of the reflecting surface composing the red light mirror member 132r (or the green light mirror member 132g) is the portion where the red light mirror member 132r (or the green light mirror member 132g) is cemented with the reticle substrate 133 shown by a point Pr (or Pg) in FIG. 6 similar to Example 1. The red light mirror member 132r, the green light mirror member 132g and the reticle substrate 233 have substantially the same refractive power. Various values associated with the reticle unit 130 according to Example 2 are listed in Table 2.

As described above, since the red light having longer wavelength, in comparison with the green light, becomes larger angle of incidence to the diffraction grating 135, the red light source 131r and the red light mirror member 132r can be disposed out side of the field of view without making total internal reflection on the image side surface 133b of the reticle substrate 133. Accordingly, a dimension in the red light source 131r side among the dimension in y-axis direction of the reticle unit 130 can be smaller than the reticle unit 30 according to Example 1.

Example 3

Finally, a reticle unit 230 according to Example 3 is explained with reference to FIG. 7. In the reticle unit 230 according to Example 3, although a green light source 231g radiates green light rays similar to Examples 1 and 2 substantially parallel to an optical axis toward an object side, a red light source 231r radiates red light rays in a direction perpendicular (in y-axis direction) to the optical axis. Accordingly, a red light lens member 232r having an aspherical surface is introduced as a converging member for guiding red light rays radiated from the red light source 231r into a reticle substrate 233. Red light rays converged by the red light lens member 232r are directly incident on a diffraction grating 235 without making total internal reflection on the image side surface 233b of the reticle substrate 233 similar to Example 2. In the reticle unit 230 according to Example 3, a center of the aspherical surface of the lens surface of the red light lens member 232r is an upper end portion in y-axis direction as shown by a point Pr in FIG. 7. A center of an aspherical surface of the reflecting surface composing a green light mirror member 232g is a portion where the green light mirror member 232g is cemented with the reticle substrate 233 as shown by a point Pg in FIG. 7 similar to Examples 1 and 2.

Various values associated with the reticle unit 230 according to Example 3 are listed in Table 3. Incidentally, the thickness of the aspherical lens of the red light lens member 232r is 5 mm. The focal length at d-line of the lens surface of the aspherical lens is 55.9 mm. The red light lens member 232r, the green light mirror member 232g and the reticle substrate 33 have substantially the same refractive power.

TABLE 3

(reticle substrate 233)

d = 5
φ = 24.8
nd = 1.5168
nC = 1.51432
νd = 64.1
Δp = 0.00047
(red light source 231r)

center of light source = (3.9, 18.0)
(red light lens member 232r)

center of aspherical surface = (0, 13.0)
shaving amount D = 4.4
r = −27.51
κ = 51.81
A4 = 0.00480
A6 = 0
A8 = 0
A10 = 0
(green light source 231g)

center of light source = (5, −15.9)
(green light mirror member 232g)

center of aspherical surface = (0, −12.3)
shaving amount D = 0.1
r = 5.83
κ = 0.16
A4 = −0.00144
A6 = −1.34186E−5
A8 = −5.29054E−6
A10 = −2.14739E−8

As explained in Example 2, in red light, the red light source 231r can be disposed out side of the field of view without making total internal reflection on the image side surface 133b of the reticle substrate 133, so that even if the red light lens member 232r for converging light by refractive power is used instead of the red light mirror member, the reticle unit 230 can be constructed.

What is claimed is:

1. A reticle unit comprising:
   two or more monochromatic light sources radiating light having different wavelengths from each other;
   a reticle substrate that is formed by a material transmitting light and has a diffraction grating formed on a surface; and
   converging portions that are provided respectively with respect to said two or more monochromatic light sources on outsides of side surface portions of the reticle substrate and for propagating inside of the reticle substrate light radiated from the two or more monochromatic light sources and converging onto the diffraction grating of the reticle substrate;
   wherein light radiated from the light sources and propagated inside of the reticle substrate via the converging portions, is diffracted by the diffraction grating, and first order diffracted light of the principal light of the light radiated from each of the light sources is emitted with an angle of diffraction of 0 degree along a common line extending in a normal direction of the diffraction grating.

2. The reticle unit according to claim 1, wherein the two or more light sources are provided at different positions from each other on or close to respective side surfaces of the reticle substrate.

3. The reticle unit according to claim 1, wherein there are two monochromatic light sources that radiate light having wavelengths that differ from each other, and the two light sources are disposed facing each other with the diffraction grating in between.

4. The reticle unit according to claim 1, wherein the distances from the respective converging portions to the diffraction grating are different from each other depending on the wavelengths of the respective light sources.

5. The reticle unit according to claim 1,
   wherein the two or more light sources are provided at different positions from each other on respective side surfaces of the reticle substrate;
   the light radiated from the light sources being incident on the reticle substrate through the respective converging portions, undergoing one total internal reflection by a surface opposite to the surface where the diffraction grating is formed on the reticle substrate and illuminating the diffraction grating, and the following conditional expression is satisfied:

$\lambda r/nr < \Delta p < \lambda g/(ng \cdot \sin(\tan^{-1}(Yg/2d)))$ where $\lambda r$ denotes the longest wavelength among wavelengths of light radiated from the two or more light sources, $\lambda g$ denotes the shortest wavelength among wavelengths of light radiated from the two or more light sources, d denotes a thickness of the reticle substrate, nr denotes a refractive index of a medium of the reticle substrate at the longest wavelength, ng denotes a refractive index of a medium of the reticle substrate at the shortest wavelength, Yg denotes a distance between the diffraction grating and a side surface of the reticle substrate where the light source radiating light having the shortest wavelength is provided, and $\Delta p$ denotes a pitch of the diffraction grating.

6. The reticle unit according to claim 1, wherein each of the converging portions is made separately from the reticle substrate, disposed with being cemented to a side surface portion of the reticle substrate, has a reflecting surface having an aspherical shape, and reflects and converges light from a respective one of the two light sources by the reflecting surface.

7. The reticle unit according to claim 6, wherein each of the converging portions has substantially a same refractive index of the reticle substrate, and makes total internal reflection of the light incident from the side surface portion of the reticle substrate by a surface opposite to the surface where the diffraction grating is formed on the reticle substrate so as to illuminate the diffraction grating.

8. The reticle unit according to claim 1, wherein the light incident from a side surface portion of the reticle substrate is totally reflected by a surface opposite to the surface where the diffraction grating is formed on the reticle substrate so as to illuminate the diffraction grating.

9. An optical apparatus comprising:
   an objective lens;
   the reticle unit according to claim 1, in which a surface of the reticle substrate where the diffraction grating is formed is disposed at a position of an image formed by the objective lens or a position substantially conjugate with the image; and an eyepiece that observes with superposing the image formed by the objective lens and the light emitted from the diffraction grating of the reticle unit.

10. A riflescope comprising:

an objective lens;

the reticle unit according to claim 1 in which a surface of the reticle substrate where the diffraction grating is formed is disposed at a position of an image formed by the objective lens or a position substantially conjugate with the image; and an eyepiece that observes with superposing the image formed by the objective lens and the light emitted from the diffraction grating of the reticle unit.

* * * * *